United States Patent
Lail et al.

(10) Patent No.: US 11,285,430 B2
(45) Date of Patent: Mar. 29, 2022

(54) NITROSAMINE DECOMPOSITION

(71) Applicant: Research Triangle Institute, Research Triangle Park, NC (US)

(72) Inventors: Marty Lail, Raleigh, NC (US); Aravind Villava Rayer Rabindran, Morrisville, NC (US); Samuel John Thompson, Chapel Hill, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 130 days.

(21) Appl. No.: 16/748,111

(22) Filed: Jan. 21, 2020

(65) Prior Publication Data

US 2020/0246745 A1    Aug. 6, 2020

Related U.S. Application Data

(60) Provisional application No. 62/800,076, filed on Feb. 1, 2019.

(51) Int. Cl.
*B01D 53/14* (2006.01)
*B01D 53/18* (2006.01)

(52) U.S. Cl.
CPC ..... *B01D 53/1425* (2013.01); *B01D 53/1475* (2013.01); *B01D 53/18* (2013.01); *B01D 2252/204* (2013.01)

(58) Field of Classification Search
None
See application file for complete search history.

(56) References Cited

U.S. PATENT DOCUMENTS

2013/0313475 A1* 11/2013 Fischer ................. B08B 7/0071
   252/190
2018/0070627 A1* 3/2018 Burton .................... A24B 15/22
2018/0079660 A1* 3/2018 Widger ............. B01D 53/1475

* cited by examiner

*Primary Examiner* — Philip Y Louie
(74) *Attorney, Agent, or Firm* — Womble Bond Dickinson (US) LLP

(57) ABSTRACT

The disclosure provides methods and systems for decreasing nitrosamine content, e.g., in the context of non-aqueous solvent systems. It includes a method including receiving a non-aqueous solvent system and contacting the non-aqueous solvent system with a composition including one or more alkoxides to give a treated solvent system having a nitrosamine content that is lower than the starting nitrosamine content. Similarly, it includes a system including a first unit configured to remove undesirable components from a gas stream; a second unit holding a composition including one or more alkoxides, and a conduit to connect these units.

27 Claims, 8 Drawing Sheets

NITROSAMINE DECOMPOSITION

CROSS-REFERENCE TO RELATED APPLICATIONS

The present application claims priority to U.S. Provisional Patent Application No. 62/800,076, filed Feb. 1, 2019, which is incorporated herein by reference in its entirety.

FEDERALLY SPONSORED RESEARCH OR DEVELOPMENT

This invention was made with government support under DE-FE0026466 awarded by the Department of Energy. The government has certain rights in the invention.

FIELD OF THE DISCLOSURE

The present disclosure relates to solvent system-based methods and systems for scrubbing gas streams and particularly to treatment of such solvent systems to minimize toxic byproducts present therein.

BACKGROUND

Combustion of fossil fuels such as coal, oil, and natural gas is expected to remain the major global energy source for years to come. Currently, 65% of the world's greenhouse gas emissions stem from fossil fuel-fired power plants, whose usage is anticipated to increase by as much as 28% by 2040 from vast growth in emerging markets including China and India. The environmental impact of anthropogenic carbon dioxide ($CO_2$) emissions has prompted a world-wide effort to reduce $CO_2$ atmospheric release. Carbon capture and sequestration (CCS) technologies have advanced over the last decade to become one of the most promising solutions to reduce $CO_2$ emissions.

The most advanced carbon capture and sequestration technology to-date is amine-based solvent scrubbing. Solvent-based $CO_2$ capture systems have high $CO_2$ capacities, reversible reactivities with $CO_2$, low heat requirements for adsorption and regeneration, and can be composed of aqueous or non-aqueous components. The monoethanolamine (MEA) solvent process has been the most rigorously studied CCS system, and has become the first commercial-scale demonstrated CCS process by SaskPower's Boundary Dam power plant in Saskatchewan, Canada, capturing up to 1.3 million tons of $CO_2$ per year.

The most prominent toxic byproducts found in amine scrubbing systems are nitrosamines, which pose both human and environmental health hazards. Nitrosamines are identified as one of the most environmentally hazardous byproducts in amine-based $CO_2$ capture processes due to their carcinogenicity. Nitrosamines formed in $CO_2$ capture solvents may be released into the environment via gaseous emissions or wash water. Exposure of atmospheric nitrosamines to direct sunlight promotes photolysis reactions that decay the nitrosamines within 30 mins. However, if the atmosphere is water-rich with fog or clouds, the photolytic degradation is much less efficient allowing for the nitrosamines to persist and pose significant health risks. Nitrosamines exhibit high aqueous solubility as well, making the foremost environmental risk to be related to water contamination. Emitted nitrosamines accumulate in water systems and avoid biodegradation in soils, persisting in lake and ground water for extended timeframes. The chemical stability and high affinity for nitrosamines to collect in water systems poses a significant threat for human safety. Nitrosamines are formed from an irreversible free radical reaction between amines and $NO_2$. These nitrosamines accumulate during the carbon capture and sequestration process and present an environmental hazard when released through gaseous emissions or by water washing.

The formation of the nitrosamines is closely related to the amine structure. Primary amines form unstable nitrosamine products that readily decompose, an tertiary amines lack the necessary amine hydrogen (N—H) bond to produce nitrosamines. Solvents with secondary amines, however, form comparatively stable nitrosamine byproducts that require additional mitigation strategies to either limit or decompose the nitrosamines in the $CO_2$ capture process. To prevent nitrosamine formation, numerous strategies have been examined, including nitrite chemical scavenging, ultraviolet degradation, advanced oxidation treatments, thermal degradation, and catalytic hydrogenation. See, e.g., Schallert, B. Measures to Control Nitrosamine Concentrations, 2011; Mercader, F. de M.; Voice e al., Nitrosamine Degradation by UV Light in Post-Combustion $CO_2$ Capture: Effect of Solvent Matrix. *Energy Procedia* 2013, 37, 701-716; International Patent Application Publication No. WO2013043802A2; Shah, A. D. et al., Application of Ultraviolet, Ozone, and Advanced Oxidation Treatments to Washwaters To Destroy Nitrosamines, Nitramines, Amines, and Aldehydes Formed during Amine-Based Carbon Capture. *Environ. Sci. Technol.* 2013, 47 (6), 2799-2808; Fine, N. A. et al. Thermal Decomposition of N-Nitrosopiperazine. *Energy Procedia* 2013, 37, 1678-168; Davie, M. G. et al. Metal-Catalyzed Reduction of N-Nitrosodimethylamine with Hydrogen in Water. *Environ. Sci. Technol.* 2006, 40 (23), 7329-7335. All of these references are incorporated by reference herein in their entireties.

Thermal decomposition of nitrosamines has been the favored approach to address the issue of nitrosamine formation in certain amine-containing solvent systems. Ideally, nitrosamine thermal decomposition could be accomplished during the desorption phase of the carbon capture and sequestration process to cleave the nitrogen-nitrogen (N—N) bond, releasing NO or $N_2O$ gas. The thermal decomposition of nitrosamines formed from noteworthy aqueous amine $CO_2$ solvent systems has been extensively studied, but this process typically requires high temperature and extended time periods to decompose nitrosamines. It has been found that treating the solvents with an inorganic base (NaOH) during solvent reclaiming (at high temperature) could selectively decompose nitrosamines with increased kinetics, albeit still requiring multiday exposure. See, e.g., Fine N. A. et al., *Environ. Sci. Technol.* 2014, 48 (10), 5996-6002; and U.S. Patent Application Publication No. US2014/0199220A1, which are incorporated herein by reference.

The referenced nitrosamine decomposition methods referenced above are applicable in the context of aqueous amine-based solvent systems; however, methods for mitigation of nitrosamine in non-aqueous solvents has not been widely studied. See Heldebrant, D. J. et al. Water-Lean Solvents for Post-Combustion $CO_2$ Capture: Fundamentals, Uncertainties, Opportunities, and Outlook. *Chem. Rev.* 2017, 117 (14), 9594-9624. It would be beneficial to provide additional strategies for the removal of nitrosamines from amine-based solvent systems, including non-aqueous solvent systems.

BRIEF SUMMARY

The present disclosure provides methods for addressing the accumulation of nitrosamines within solvent systems, such as certain solvent systems employed for the removal of acid gases from gas streams. Such methods are particularly applicable in the context of non-aqueous solvent systems (e.g., including, but not limited to, amine-based solvent systems). The disclosure further provides systems (e.g., gas treatment systems) comprising one or more components suitable for decreasing the accumulation of nitrosamines within such solvent systems.

In one aspect, the disclosure provides a method of decreasing nitrosamine content, comprising: receiving a non-aqueous solvent system having a first nitrosamine content; and contacting the non-aqueous solvent system with a composition comprising one or more alkoxides to give a treated solvent system having a second nitrosamine content that is lower than the first nitrosamine content. In some embodiments, the non-aqueous solvent system is a solvent system for acid gas removal from a gas stream. For example, the non-aqueous solvent system may be a solvent system for acid gas removal from a flue gas stream, a nitric acid plant stream, or an adipic acid plant stream. In some embodiments, the non-aqueous solvent system is an amine-based solvent system.

The one or more alkoxides, in certain embodiments, have particular pH values. For example, in some embodiments, the one or more alkoxides have pKa values of about 14.5 or greater. In some embodiments, the one or more alkoxides have pKa values of about 14.5 to about 18.

Certain exemplary alkoxides include, but are not limited to, alkoxides selected from the group consisting of methoxides, ethoxides, propoxides, butoxides, pentoxides, hexanoxides, and combinations thereof. In some embodiments, the one or more alkoxides are alkali salts. For example, such alkali salts in certain embodiments are sodium or potassium salts. Certain non-limiting alkoxides from which the one or more alkoxides can be selected include sodium methoxide, sodium isopropoxide, and/or potassium tert-butoxide.

The composition, in some embodiments, is a solid composition. In some embodiments, the composition is a liquid composition (e.g., a solution, dispersion, emulsion, or the like). In certain embodiments, the composition is a liquid composition and comprises the one or more alkoxides and one or more solvents, wherein the one or more solvents comprise alcohols, polyethylene glycol dialkyl ethers, and combinations thereof.

The method can be conducted under varying conditions. In some embodiments, no heat is intentionally applied during the contacting. In other embodiments, the method further comprises applying heat during the contacting. In some embodiments, the second nitrosamine content is about 10 ppm or less. In some embodiments, the second nitrosamine content is about 1 ppm or less. In some further embodiments, the second nitrosamine content is about 100 ppb or less.

The disclosed method can, in certain embodiments, further comprise drying the solvent system before the contacting. The method of drying is not particularly limited. In various embodiments, the drying comprises desiccation, distillation, or a combination thereof. For example, dessication can employ a drying agent selected from the group consisting of molecular sieves, silica, sodium sulfate, potassium sulfate, magnesium sulfate, calcium chloride, or a combination thereof. In certain embodiments, the method further comprises calculating a minimum amount of the one or more alkoxides to be used based on the first nitrosamine content and a content of water present in the solvent system. For example, the calculated minimum amount of the one or more alkoxides can be an amount stoichiometrically equal to a sum of moles of nitrosamine and water present in the solvent system.

In some embodiments, the solvent system is present in a first unit of a gas treatment system and the method further comprises directing the solvent system to a second unit of the gas treatment system, wherein the contacting is conducted in the second unit. Such a method can optionally be such that the directing the solvent system further comprises passing the solvent system through a drying unit to remove water before the contacting. In certain embodiments, the contacting is conducted at pre-determined values of first nitrosamine content. For example, the contacting can be conducted whenever the first nitrosamine content is about 4% by weight or whenever the first nitrosamine content is about 3% by weight.

In another aspect of the disclosure is provided a method of treating a gas stream to remove acid gases therefrom, comprising: bringing the gas stream into contact with a non-aqueous solvent system, wherein the bringing results in removal of acid gases from the gas stream and formation of nitrosamines within the non-aqueous solvent system such that the non-aqueous solvent system has a first nitrosamine content; and contacting the non-aqueous solvent system with a composition comprising one or more alkoxides to give a treated solvent system having a second nitrosamine content that is lower than the first nitrosamine content.

In a further aspect is provided a system for the removal of undesirable components from a gas stream, comprising: a first unit configured to bring the gas stream into contact with a non-aqueous solvent system and remove the undesirable components from the gas stream; and a second unit comprising a composition comprising one or more alkoxides; and a conduit to connect the first and second units such that the first and second units are in fluid contact with one another. Such a system may optionally further comprise a drying unit between the first and second units.

In a still further aspect is provided a system for treatment of a non-aqueous solvent system contaminated with one or more nitrosamines, comprising: a unit comprising a composition comprising one or more alkoxides.

These and other features, aspects, and advantages of the disclosure will be apparent from a reading of the following detailed description together with the accompanying drawings, which are briefly described below.

BRIEF DESCRIPTION OF THE DRAWINGS

Figure 1:
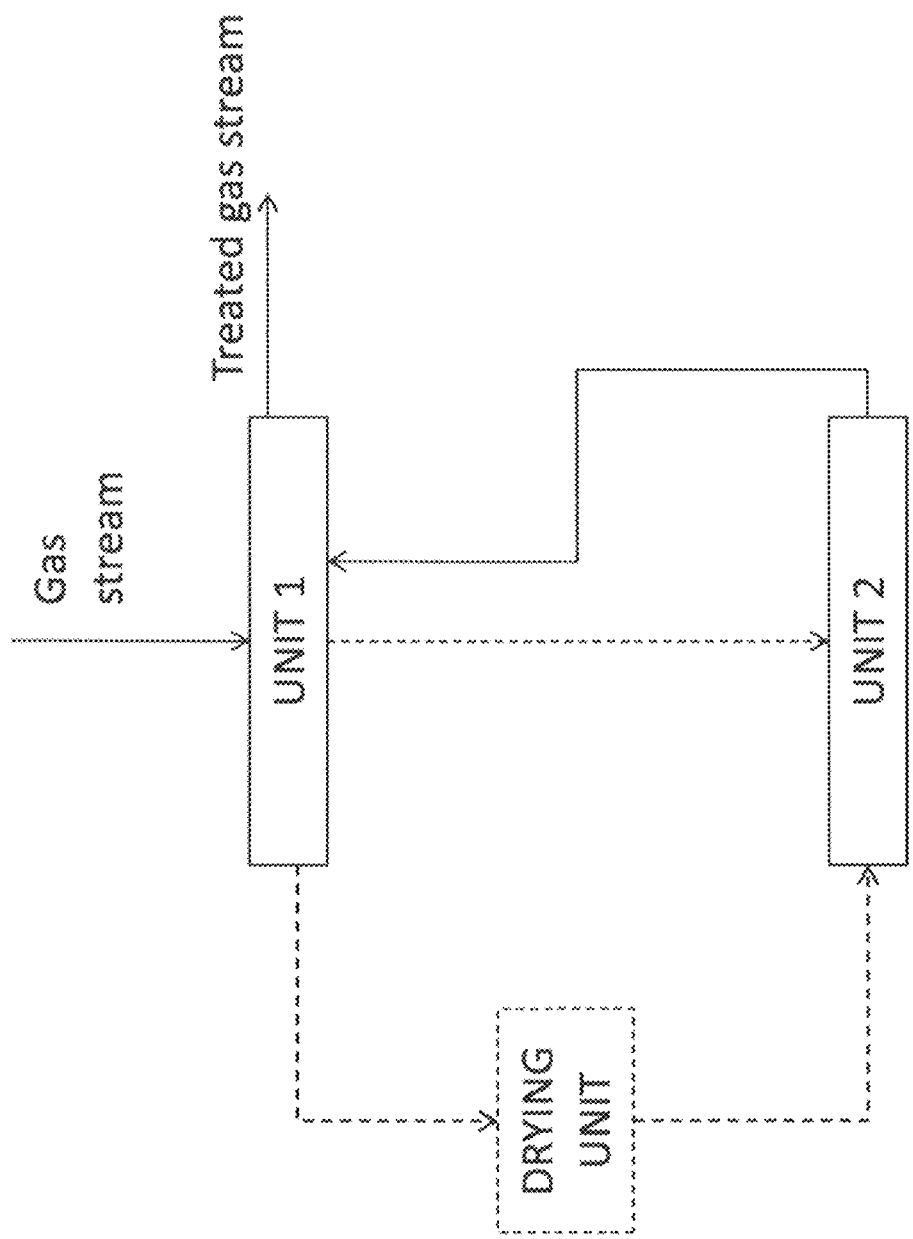
Figure 2:
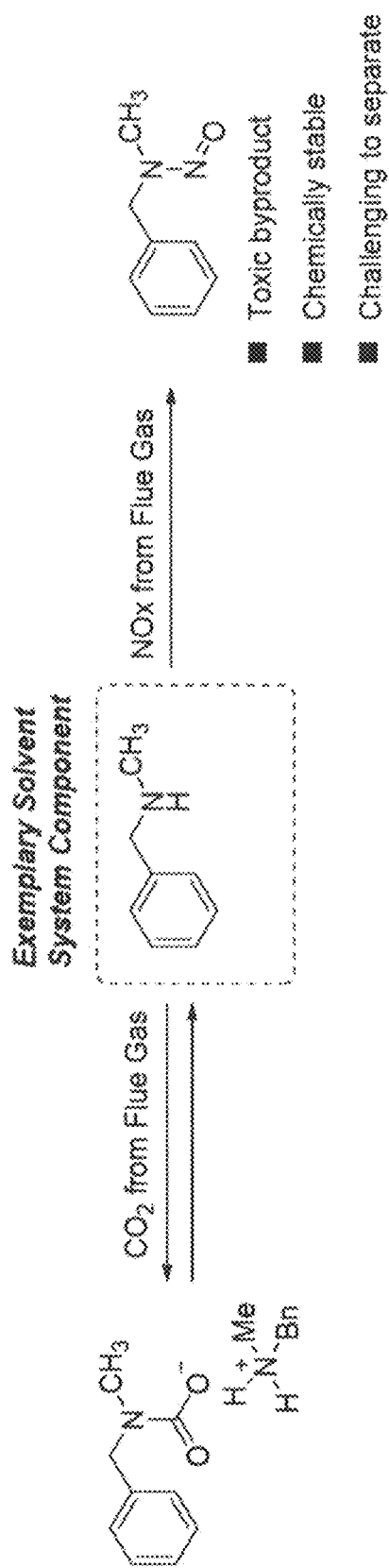
Figure 3:
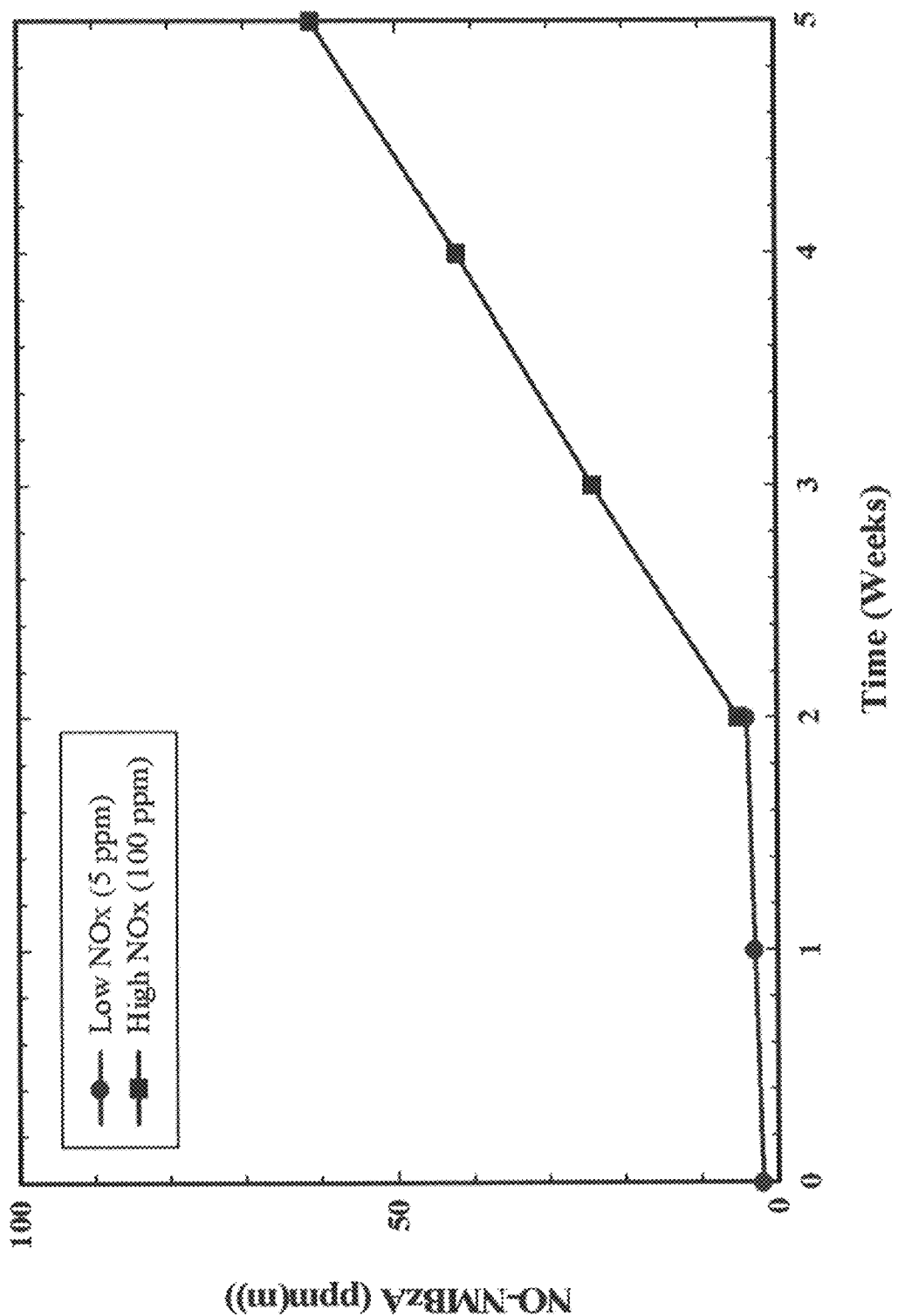
Figure 4:
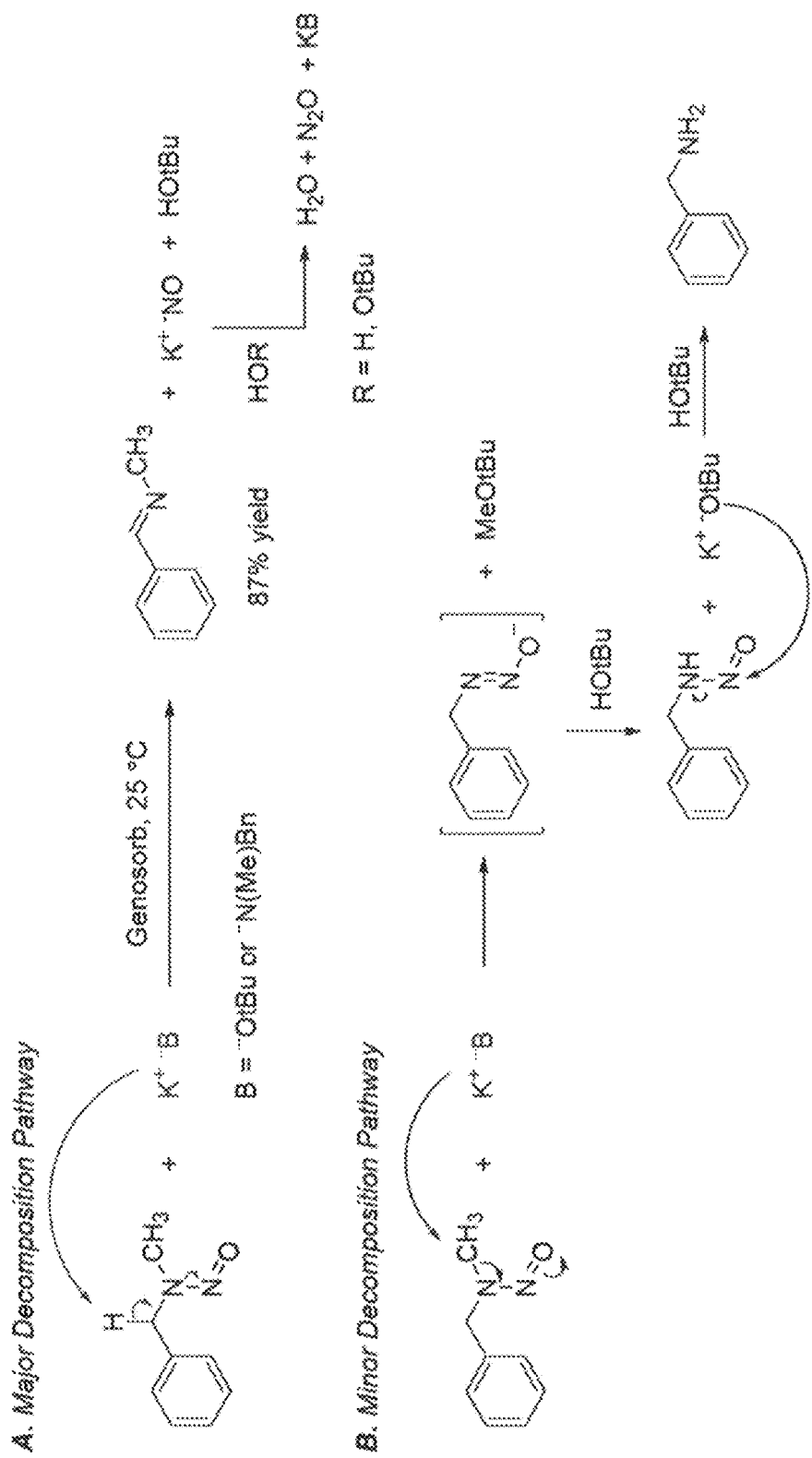
Figure 5:
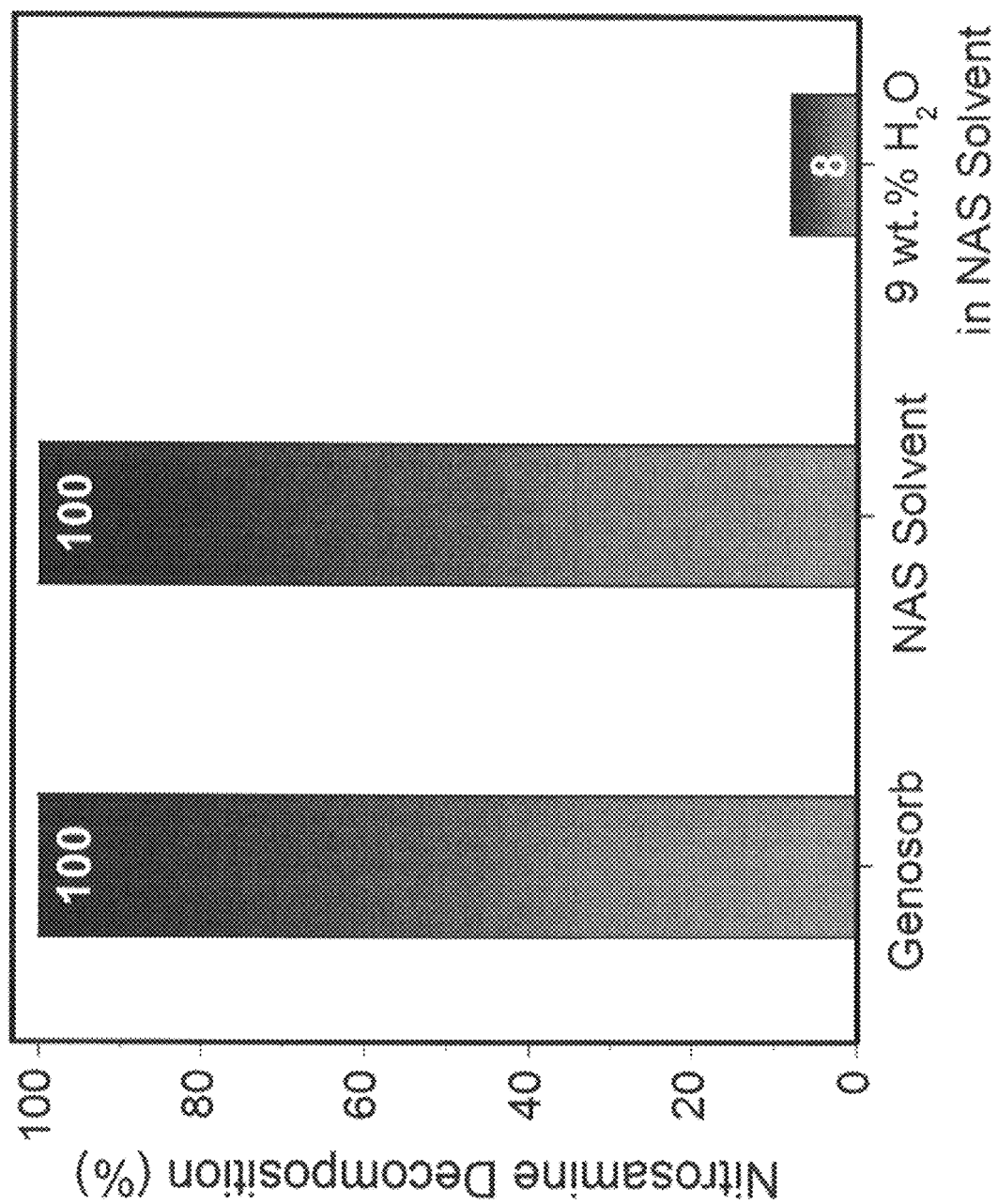
Figure 6:
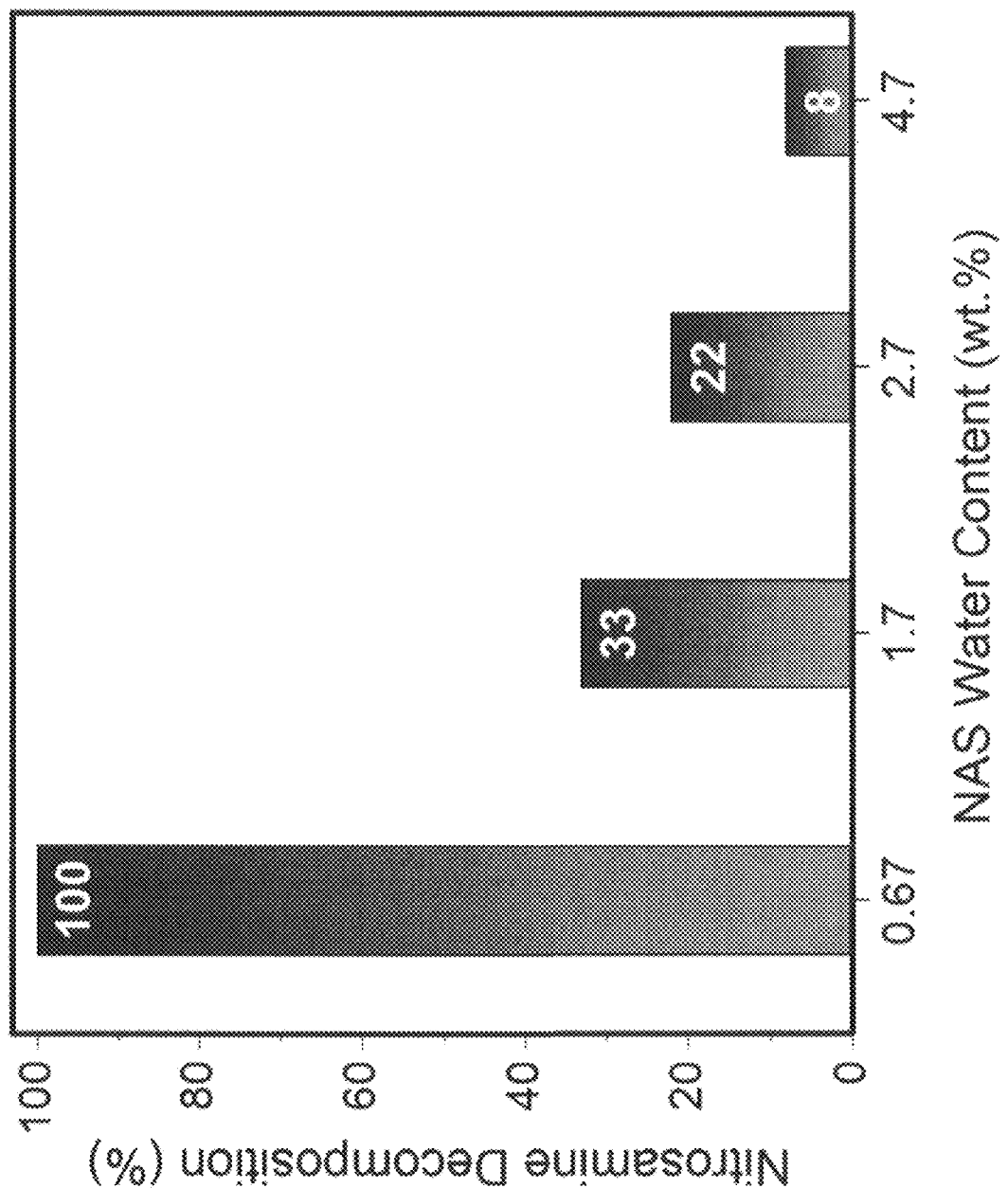
Figure 7:
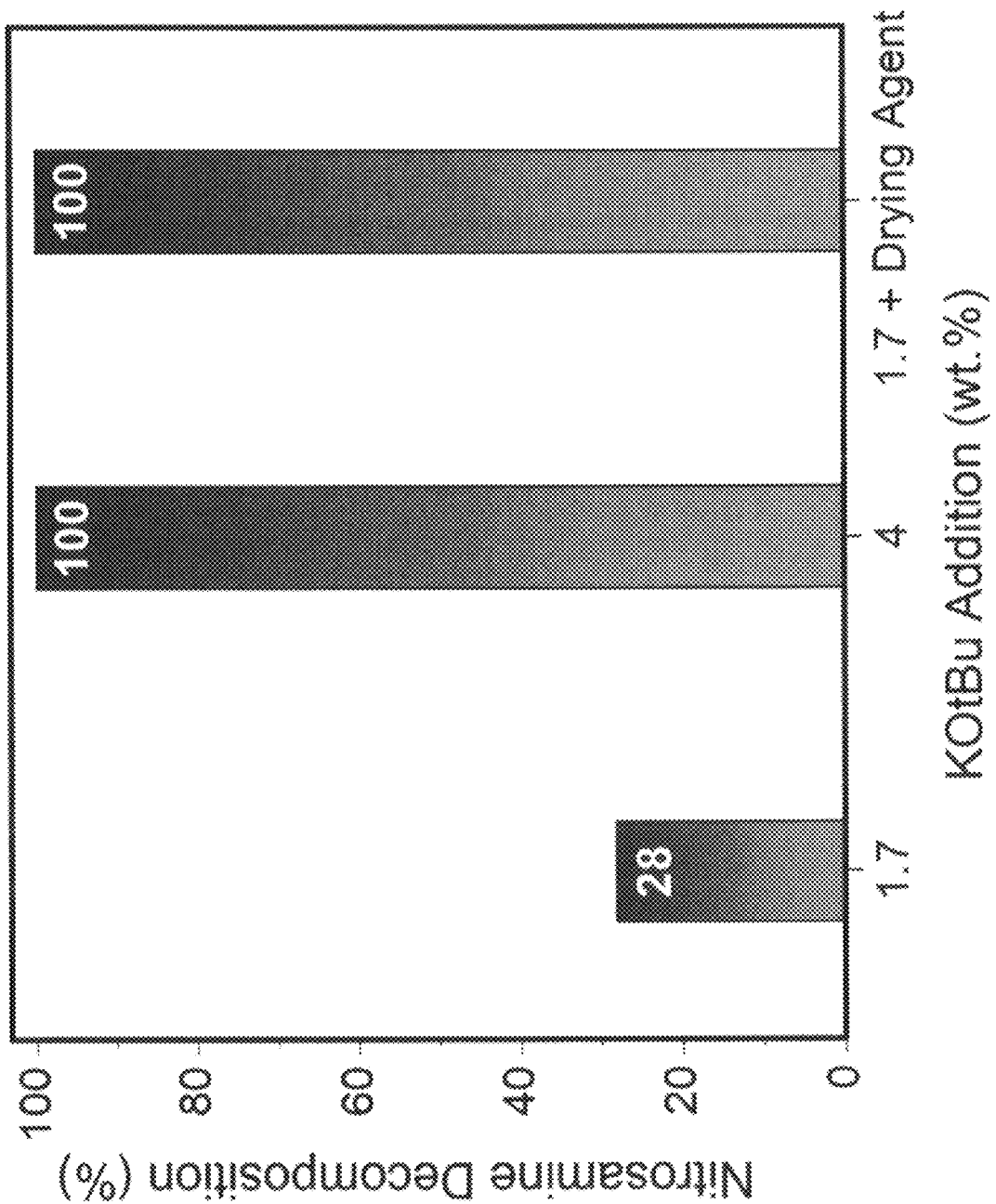
Figure 8:
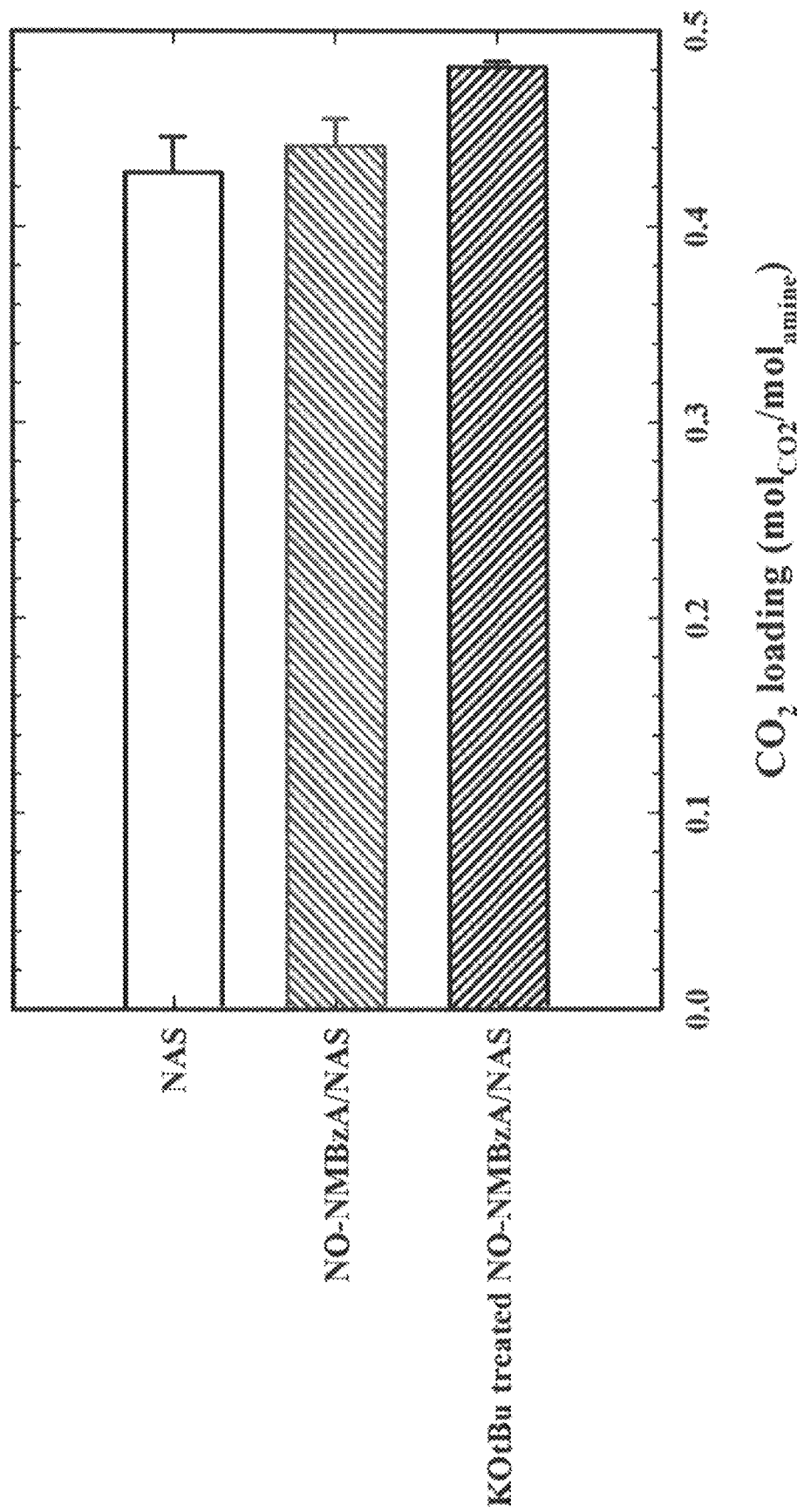

Having thus described the disclosure in the foregoing general terms, reference will now be made to the accompanying drawings, which are not necessarily drawn to scale, and wherein:

FIG. 1 is a schematic of one embodiment of a solvent treatment system according to certain embodiments of the present disclosure;

FIG. 2 is a schematic representation of reactions between one solvent system component and an acid gas ($CO_2$) and the solvent system component and NOx (producing nitrosamines);

FIG. 3 is a graph depicting nitrosamine formation as a function of time in an exemplary solvent system used for flue gas treatment;

FIG. 4 is a schematic representation of byproduct formation from N—NO;

FIG. 5 is a graph of experimental decomposition of nitrosamine in a 4000 ppm NO-NMBzA-containing system;

FIG. 6 is a graph of experimental decomposition of nitrosamine in a 4000 ppm NO-NMBzA-containing system at varying water levels;

FIG. 7 is a graph of experimental decomposition of nitrosamine in a 4000 ppm NO-NMBzA-containing system at 2% water loading; and FIG. 8 is a graph of $CO_2$ loading capacity of a solvent system before and after nitrosamine decomposition treatment as described herein.

DETAILED DESCRIPTION

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, the singular forms "a," "an," "the" and the like include plural referents unless the context clearly dictates otherwise.

As described hereinafter, the present disclosure relates to methods and systems for addressing the presence of nitrosamines in solvent systems and, in particular, in non-aqueous solvent systems. The disclosed methods and systems are particularly effective in contexts wherein nitrosamine buildup within non-aqueous solvent systems negatively impacts the efficacy of the solvent system in capturing components, e.g., acid gases from gas streams.

A system according to one aspect of the present disclosure is schematically illustrated in FIG. 1. The system depicted in FIG. 1 is not understood to be limiting of the invention; rather, it represents one exemplary embodiment of a system according to the present disclosure. As shown, a gas stream enters Unit 1 of the system. The gas stream can vary but is generally an exhaust gas that is desirably treated before further use and/or release into the atmosphere. The origin of the gas stream treated by means of the disclosed system and method is not particularly limited and can generally be any gas stream that is desirably subjected to treatment to remove one or more components therefrom (e.g., treatment with a solvent to "scrub" the gas stream of one or more undesirable components). Further, the disclosed method and system is particularly applicable in the context of treating gas streams wherein one or more components of the gas stream and/or one or more components of the solvent with which it is to be treated has the potential of forming nitrosamines.

In one embodiment, the exhaust gas is a post-combustion gas stream (referred to herein also as a "flue gas" stream), e.g., originating from the combustion of fossil fuels such as coal, oil, or natural gas. For example, the gas stream can be the byproduct of power plant operations. It is generally known that such gas streams comprise acid gases such as carbon dioxide ($CO_2$) and, due to the environmental impact and increasing regulations on emissions of such acid gases, such post-combustion gas streams are typically treated to decrease the acid gas content thereof. In some embodiments, the gas stream can be the byproduct of a chemical plant stream, such as from a nitric acid plant stream or an adipic acid plant stream (e.g., as seen in the nylon industry). It is to be understood that the system and/or method can be adapted accordingly for the removal of any one or more contaminants as applicable to the particular source of the gas stream, so long as the general principles outlined herein are employed (e.g., the gas stream is contacted with a solvent for the removal of one or more components therefrom, and some nitrosamine is present or is formed within the solvent during use, which is advantageously removed/decomposed).

One method of treatment for removal of certain undesirable components (e.g., acid gases) from gas streams is the use of non-aqueous solvent systems. In the embodiment depicted in FIG. 1, a non-aqueous solvent system is present within Unit 1 of the system. It is noted that this depiction is not intended to be limiting and, in various embodiment, additional units capable of providing various functions can be present, e.g., before the gas stream reaches Unit 1 or between any of the units shown. In the illustrated embodiment, the gas stream is treated within Unit 1 to reduce the content of one or more components in the gas stream (e.g., to reduce the acid gas content). Also, although Units 1, 2, and the Drying Unit are depicted as separate, individual components of the system, it is to be understood that any two or three (or more) components can be combined within a single housing where suitable and thus, the system is not limited to any particular number of individual units.

The solvent system within Unit 1 of the system depicted in FIG. 1 can vary, although it is generally a non-aqueous solvent (NAS). Various types of solvent systems, e.g., for the removal of acid gases from gas streams are described, for example, in International Patent Application Publication Nos. WO2012/031274; WO2012/031281; and WO2013/130997A1 to Lail et al.; Lail et al., *Energy Procedia* 2014, 63, 580-594; Mobley et al., *Ind. Eng. Chem. Res.* 2017, 56(41), 11958-11966; Rayer et al., *Chem. Eng. J.* 2018, 348, 514-525; Zhou et al., RTI International and SINTEF: Trondheim, Norway, 2017 (available at https://www.sintef.no/globalassets/project/tccs-9/presentasjoner/a3/11---tccs-9---2017-06-12-nas-presentation-zhou.pdf); and Heldebrant et al., *Chem. Rev.* 2017, 117(114), 9594-9624, which are all incorporated herein by reference in their entireties. Solvent systems that are relevant in the context of the present disclosure are generally those subject to contamination by nitrosamines, as will be more fully described herein below. In certain embodiment, the solvent system comprises an amine-based scrubbing solvent system.

By passing the gas stream through the solvent in Unit 1, the content of one or more undesirable components (e.g., acid gases, such as $CO_2$) is desirably decreased, providing a treated gas stream (as shown) having a decreased content of undesirable components. The treated gas stream advantageously has a content of the undesirable component(s), e.g., acid gas (e.g., $CO_2$) that meets or is below the limits set by environmental regulations. Consequently, the treated gas stream in various embodiments can be directly released or reused after treatment within Unit 1. In some embodiments, the treated gas stream may be further treated in one or more additional units within the depicted system or within a separate system before release or reuse to further reduce the content of that undesirable component or otherwise treat the gas stream (e.g., to remove other component(s) therefrom).

As increasing amounts of the gas stream are treated within Unit 1, the composition of the solvent within the unit can change. For example, flue gases typically contain some water content; as such, water can, in some embodiments, accumulate within Unit 1. In addition, reaction between various components of the gas and the solvent system can, in some embodiment, result in the production of additional species. For example, $NO_x$ present in gas streams can react with components present within certain solvent systems to form nitrosamines. $NO_x$ is a common component of, e.g., post-combustion gas streams, which may include $NO_x$ at concentrations of 1500-2500 ppm (although it is noted that remediation typically reduces this value to less than about 100 ppm). Regardless, some $NO_x$ content is typically present in such gas streams and $NO_x$ gases (e.g., $NO_2$) can react with certain amines that may be found within certain solvent systems to form nitrosamines.

The formation of nitrosamines in such contexts is closely related to the amine structure. Primary amines form unstable nitrosamine products that readily decompose, while tertiary amines lack the necessary amine hydrogen (N—H) bond to produce nitrosamines. Solvents with secondary amines, however, form comparatively stable nitrosamine byproducts via an irreversible, free-radical reaction. Nitrosamines are generally understood to be carcinogenic and chemically stable and therefore are desirably eliminated from these systems due to health and environmental concerns, as well as ensuring the continued operation of the solvent system for effectively treating gas streams to remove acid gases therefrom. One such solvent system is shown in FIG. 2, namely, a solvent system comprising N-methylbenzylamine. As shown, the N-methylbenzylamine advantageously reacts with $CO_2$, and thus effectively scrubs $CO_2$ from $CO_2$-containing gas streams but can also irreversibly react with any $NO_x$ that may be present to form nitrosamine byproduct(s).

An experimental (lab-scale) determination of the increase in nitrosamine content (here, N-nitroso-N-methylbenzylamine, NO-NMBzA) in one particular solvent system (comprising N-methylbenzylamine) resulting from the addition of $NO_x$ to the gas stream being treated is provided in FIG. 3. This study demonstrates that $NO_x$ introduction to the solvent resulted in increasing nitrosamine content therein. In particular, at low $NO_x$ levels (5 ppm), ~8 ppm of NO-NMBzA was formed over the course of two weeks; however, at higher $NO_x$ levels (100 ppm), the amount of nitrosamine steadily increased to >50 ppm over three additional weeks. It is noted that the disclosure focuses on nitrosamine contamination resulting from reaction between $NO_x$ and one or more components of a non-aqueous solvent system; however, the disclosure is not intended to be limited thereto. The principles outlined herein are broadly applicable to any non-aqueous solvent system contaminated with nitrosamines, regardless of the origin of the nitrosamines.

The present disclosure provides a novel means for the decomposition of nitrosamines, e.g., within non-aqueous solvent systems. As used herein, solvent in Unit 1 comprising any amount of nitrosamine is referred to herein as a "nitrosamine-contaminated" solvent. In the system embodiment shown in FIG. 1, at least a portion of the nitrosamine-contaminated solvent in Unit 1 is removed therefrom and treated in a separate unit (referred to in FIG. 1 as Unit 2). Within Unit 2, the nitrosamine-contaminated solvent is treated to reduce the nitrosamine content thereof. As referenced above, treatment to reduce the nitrosamine content is not limited to being conducted in a separate unit of the system as shown, so long as the principles outlined herein are Treatment within Unit 2 can be a batch or continuous process, and this procedure could be done in a slip-stream or batch modus during operation. The nitrosamine-contaminated solvent can be removed from Unit 1, for example, when the content of nitrosamines reaches a certain amount. In such embodiments, Unit 1 is equipped with a means for monitoring nitrosamine content in the solvent system. When the nitrosamine content reaches a pre-determined value, e.g., about 1% by weight or greater, about 2% by weight or greater, about 3% by weight or greater, about 4% by weight or greater, about 5% by weight or greater, etc., the solvent can be diverted (e.g., manually or automatically) to Unit 2 for treatment to reduce the nitrosamine content. In other embodiments, the solvent system in Unit 1 can be regularly diverted at pre-determined intervals to ensure the nitrosamine content remains low in the solvent system, e.g., once per hour, once per day, once per 2 days, etc. In other embodiments, treatment of the solvent from Unit 1 can be conducted on a continuous basis. The regularity with which the solvent of Unit 1 is treated is dependent, for example, on the content of $NO_2$ in the acid gas being treated, the amine content of the solvent system, the volume of acid gas treated by the system, and the like. As such, specific determination of the regularity and timing of treatment to remove nitrosamines from the solvent will be made based on the specific system under consideration.

Within Unit 2, the nitrosamine-contaminated solvent system is treated to reduce the nitrosamine content thereof. This treatment is conducted by contacting the contaminated solvent with a treatment composition comprising an alkoxide. The inventors have surprisingly found that treatment with an alkoxide results in fast, effective decomposition of nitrosamines, even under mild conditions (although the disclosed method/system is not limited to such mild conditions).

The specific alkoxide or alkoxides used in this step can vary. "Alkoxide" as used herein generally encompasses compounds having an organic ("R") group bound to a negatively charged oxygen, and alkoxides are generally depicted as "R—O$^-$". "R" is generally, for the purposes of the present application, a substituted or unsubstituted alkyl group, wherein the alkyl group can be cyclic or acyclic and branched or unbranched (e.g., $C_1$-$C_{10}$ alkyl, $C_1$-$C_8$ alkyl, $C_1$-$C_6$ alkyl, $C_2$-$C_{10}$ alkyl, $C_2$-$C_8$ alkyl, $C_2$-$C_6$ alkyl, $C_3$-$C_{10}$ alkyl, $C_3$-$C_8$ alkyl, or $C_3$-$C_6$ alkyl). Substitutions can be, for example, additional alkyl groups, alkoxy groups (e.g., $C_1$-$C_6$ alkoxy groups) halogens, halogenated alkyl groups, hydroxyl groups, and the like. In practice, alkoxides are commonly provided as salts, e.g., as alkali (such as potassium or sodium) salts.

Alkoxides are generally basic and, in certain embodiments of the present disclosure, suitable alkoxides have pH values of about 14.5 or greater, e.g., pH values within the range of about 14.5 to about 18. Certain specific alkoxides include, but are not limited to, methoxides, ethoxides, propoxides (e.g., isopropoxides or tert-butoxides), pentoxides, hexanoxides, etc., and combinations thereof. Specific examples are sodium methoxide, potassium tert-butoxide, and/or sodium isopropoxide.

The amount of alkoxide required for effective treatment of contaminated solvent can vary. Generally, the amount of alkoxide depends on the amount of nitrosamine present in the contaminated solvent. This amount can vary further depending, for example, on the content of water and, possibly, other impurities present within the solvent to be treated. It is understood that alkoxides can react with water and, in some embodiments, may react with water present within the solvent to be treated. As such, a molar amount of alkoxide equal to the total moles of nitrosamine and water present in the solvent to treated is typically the minimum amount of alkoxide employed within Unit 2. In practice, the contaminated solvent is generally treated with a treatment composition comprising a molar excess of alkoxides (based on the moles of nitrosamines and water in the contaminated solvent).

Although not intending to be limited by theory, it is believed that, in certain embodiments, the alkoxide provides the desired nitrosamine decomposition via base deprotonation of the nitrosamine, initiating an E2-elimination of the nitrosyl anion, —NO, through N—N bond cleavage. In such embodiments, it is believed that the nitrosyl anion extracts a hydrogen atom from the solution to form hyponitrous acid, which may spontaneously decompose to form nitrous oxide ($N_2O$). The minor decomposition pathway forming benzylamine may, in such embodiments, proceed through a primary N-nitrosamine intermediate. Attack of the N-methyl group of NO-NMBzA by KOtBu could form methyl tert-butyl ether and N-nitrosobenzylamine after hydrogen abstraction. The primary nitrosamine is very electron deficient at the nitrogen atom, promoting further attack by the alkoxide at the nitroso nitrogen to afford benzylamine after hydrogen abstraction. One example of such a mechanism (which is not limiting, but which is representative of the mechanism of certain such nitrosamine decompositions) is shown in FIG. 4.

The "treatment composition" comprising the one or more alkoxides with which the contaminated solvent is brought into contact can vary. In some embodiments, the composition is a solid. In some embodiments, the composition is in liquid form (e.g., pre-dissolved in any suitable solvent within which it is substantially or fully soluble). As such, the composition can be a solution, a dispersion, an emulsion, or the like. In particular embodiments, the composition is a solution. To provide the desired composition form (e.g., solution), the solvent will necessarily vary depending on the particular alkoxide. In some particular embodiments, the solvent of a liquid treatment composition can comprise an alcohol (e.g., including, but not limited to, methanol). In some embodiments, the solvent comprises a poly(ethylene glycol) (PEG) backbone, e.g., containing 1-100 repeating units), which may optionally comprise alkoxylated end groups (e.g., C1-C100 alkoxylated end groups). As such, certain solvents employed in a liquid treatment composition are described as polyethylene glycol dialkyl ethers (where each alkyl ether comprises from 1-100 carbons), including, e.g., polyethylene glycol dialkyl ethers with alkyl ethers comprising from 1-20 carbons, 1-10 carbons, or 2-8 carbons, e.g., 1 carbon, 2 carbons, 3 carbons, 4 carbons, 5 carbons, 6 carbons, 7 carbons, 8 carbons, 9 carbons, or 10 carbons. One such exemplary solvent is commercially available Genosorb® (Clairant) and, in particular embodiments, Genosorb® 1843 is used (which comprises a mixture of polyethylene glycol dibutyl ethers). Mixtures of such solvents are also envisioned (e.g., mixtures of two or more alcohols, mixtures of two or more solvents with PEG backbones, and mixtures of one or more alcohols and one or more solvents with PEG backbones). In certain embodiments, the solvent of the liquid treatment composition (and the liquid treatment composition in its entirety) is substantially hydrophobic. A liquid treatment composition, where employed, is advantageously substantially "dry" (i.e., comprising little to no water).

In some embodiments, the contaminated solvent passes directly from Unit 1 to Unit 2. In some embodiments, because water can react with alkoxides within Unit 2, it may be advantageous to dry the contaminated solvent before directing it from Unit 1 to Unit 2. Although not limited thereto, drying the contaminated solvent can be particularly beneficial where the gas stream being treated has a high water content, e.g., giving a contaminated solvent with high water content. Passing the contaminated solvent through a drying unit, as shown in FIG. 1, is therefore an optional additional step of the disclosed method/system.

The drying unit can be any type of drying unit conventionally employed for removal of water from solvents. The exact operation and composition can vary depending in particular on the type of solvent employed within Unit 1 for acid gas removal. In some embodiments, the optional drying unit may include solid drying agents through which the contaminated solvent passes before entering Unit 2. Suitable solid drying agents are known in the art and include, but are not limited to, molecular sieves (e.g., zeolites, such as 3-4 Å zeolites), silica, sodium sulfate, potassium sulfate, magnesium sulfate, calcium chloride, or a combination of any two or more thereof. In some embodiments, other drying means can be employed within the drying unit, e.g., decanting, heating, application of vacuum, and the like. The amount of water reduction within the optional drying unit is not particularly limited. However, as referenced above, the greater the water content in the contaminated solvent, the greater the moles of alkoxide that must be employed in Unit 2 for effective reaction with nitrosamines in the solvent. As such, in some embodiments, it may be advantageous to minimize the water content, e.g., to a water content of about 1% by weight or less, about 0.5% by weight or less, about 0.1% by weight or less, about 0.05% by weight or less, or about 0.01% by weight or less based on the weight of the contaminated solvent.

The time for which the contaminated solvent is contacted with the one or more alkoxides within Unit 2 can vary. Advantageously, in some embodiments, the treatment time is short, e.g., about 5-20 minutes of contact between the treatment composition and the contaminated solvent. In some embodiments, this treatment time is 30 minutes or less, about one hour or less, about 2 hours or less, about 3 hours or less, about 4 hours or less, about 5 hours or less, about 10 hours or less, or about 24 hours or less. The time for which the treatment composition and the contaminated solvent is not particularly limited. In certain embodiments, the contact time is that time required to reduce the nitrosamine below a pre-determined amount. For example, in some embodiments, the contact is maintained at least until the nitrosamine content in the solvent falls below about 1 weight percent, below about 0.5 weight percent, below about 0.4 weight percent, below about 0.3 weight percent, below about 0.2 weight percent, below about 0.1 weight percent, below about 0.05 weight percent, or below about 0.01 weight percent based on the weight of the solvent.

The treatment can advantageously be conducted without required heating, and can, in some embodiments, achieve the desired nitrosamine reduction in a reasonable timeframe without heating. However, the treatment is not limited as such; in some embodiments, heat can be applied to the treatment composition and/or the solvent system before, during, or after heating, to promote decomposition of the nitrosamine. In various embodiments, the disclosed method is effective for nitrosamine decomposition at temperatures of about 25° C. to about 150° C., although, as referenced, it is not limited thereto, and temperatures higher and lower may, in some embodiments, be employed. Advantageously, in some embodiments, the disclosure encompasses a system or method of treating contaminated solvent to remove nitrosamines without the addition of heat thereto. The times described herein and the specific reductions of nitrosamine content disclosed herein are understood to be relevant, in some embodiments, to such treatment without added heat.

Once the desired nitrosamine reduction has been obtained, the treated solvent can be, in some embodiments, returned to Unit 1 as shown in FIG. 1. Advantageously, the treatment process described above to decompose nitrosamines present in contaminated solvent does not significantly affect the effectiveness of the solvent. For example, where the solvent is designed for acid gas (e.g., $CO_2$) removal, the disclosed system and method advantageously do not significantly hinder subsequent $CO_2$ loading of the solvent. As such, after one cycle of nitrosamine removal as described herein above, the treated solvent advantageously retains at least about 80%, at least about 90%, at least about 95%, at least about 96%, at least about 97%, at least about 98%, at least about 99%, at least about 99.5%, or at least about 99.9% of its original acid gas removal capability (as determined, e.g., by $CO_2$ acidic evolution, measured for example with a carbon dioxide analyzer such as HORIBA PIR-2000). The cycle shown and described herein can be conducted numerous times during use of the solvent system, such that the solvent system can be treated and reused about 2 or more times, about 5 or more times, about 10 or more times, about 20 or more times, about 30 or more times, about 50 or more times, about 75 or more times, about 100 or more times, about 150 or more times, about 200 or more times, about 500 or more times, and the like.

The present disclosure encompasses both the system (as shown in FIG. 1) and the associated method. As such, the disclosure includes a method of decreasing nitrosamine content, comprising: receiving a non-aqueous solvent system; and contacting the non-aqueous solvent system with a composition comprising one or more alkoxides to give a treated solvent system having a nitrosamine content that is lower than the first nitrosamine content, wherein various parameters and features of the method can be modified consistent with the system disclosure provided herein above.

EXAMPLES

Aspects of the present invention is more fully illustrated by the following examples, which are set forth to illustrate certain aspects of the present invention and are not to be construed as limiting thereof.

Several strategies to decompose nitrosamines were examined, including heat, inorganic bases, hydroxyl radicals, and alkoxides. Remarkably, alkoxide treatment was found to selectively decompose NO-NMBzA at ambient temperature within fifteen minutes. The unprecedented low temperature decomposition provides a fast and effective process to control nitrosamine build-up in the NAS solvent. Additionally, the alkoxide treated solvent increased the $CO_2$ loading capacity of the NAS from 0.44 to 0.48 $mol_{CO_2}/mol_{amine}$ from temporary carbonate formation, but advantageously, the alkoxide treatment does not hinder the $CO_2$ loading. Alkoxide bases are sensitive to water, making this nitrosamine decomposition specifically aimed for water-lean solvents. For example, non-aqueous solvents (NAS's) can be operated below 1-5 wt. % water content through water management during the carbon capture process, affording a solvent that is particularly applicable for alkoxide treatment (although, as outlined herein above, the disclosed method/system is not limited thereto).

Instrumentation/Method:

Gas chromatography of nitrosamine samples was conducted in an Agilent Technologies 6890 GC system equipped with a 5975C VL MSD. Samples were taken directly from the reaction solution or diluted with methanol and a micro syringe was used to inject 1.0 µL of sample directly into the cool-on-column inlet of the GC. An HP-5MS column (30 m×0.25 mm, 0.25 µm film thickness with 5% phenyl-methyl-polysiloxane as the stationary phase) was used for the separation of the components. The standard method (with He as carrier gas) used for all runs involved an initial oven temperature of 35° C. (held for 5 min) followed by a 20° C. min' ramp to 300° C. (held for 5 min). Quantification of the nitrosamine remaining in the solvent was determined using a six-point calibration curve made with mesitylene as an internal standard over the range of 200 ppm to 5000 ppm. The correlation coefficient ($R^2$) was 0.9996.

Solvents were loaded with $CO_2$ by bubbling $CO_2$ into 50 mL of the solvent in a round bottom flask kept at 25° C. for 2 hrs. Quantification of the $CO_2$ loaded was determined by injecting 1.0 mL of the $CO_2$-loaded sample into an experimental set-up developed for $CO_2$ analysis via acidic evolution using 30 wt. % $H_2SO_4$ solution and $N_2$ as a carrier gas. This procedure was repeated for NAS solvent with and without treatment.

Thermal Decomposition (Comparative):

To a 25-mL round bottomed flask was added 5.0 g of the stock NO-NMBzA in Genosorb®1843 solution. An aliquot of the mixture was immediately taken for GCMS analysis to quantify the initial nitrosamine concentration. The flask was equipped with a reflux condenser and stir bar and placed in an oil bath set to 150° C. Known aliquots were taken from the sample at desired timeframes by syringe for GCMS analysis. The mixture was left to stir for 7 days at this temperature.

Over 2 days, the concentration of the nitrosamine decreased by 8.6 mol %. After 7 days, 15.1 mol % decomposition was achieved, leaving 3002 ppm of NO-NMBzA remaining in the solvent. The slow rate of decomposition for NO-NMBzA is comparable to electron-rich amines examined by Rochelle and coworkers, which required >5 days for decomposition at 150° C. See Fine et al., Energy Procedia 2013, 37, 701-716 and Fine et al., Environ. Sci. Technol. 2014, 48(10), 5996-6002, which are incorporated herein by reference in their entireties. The comparative thermal treatment with inorganic base (using NaOH, KOH, or $K_2CO_3$) at 150° C. for 18 hours decomposed NO-NMBzA by 7 mol %, 9 mol %, and 3 mol % respectively.

Inorganic Base-Promoted Thermal Decomposition (Comparative):

To a 40 mL glass vial equipped with a magnetic stir bar was added the inorganic base (0.2 g, 4.0 wt. %) followed by 5.0 g of the stock NO-NMBzA in Genosorb®1843 solution. The vial was sealed with a Teflon cap, placed in an oil bath that was preheated (25-150° C.), and stirred for 18 h or 80 h. Upon time completion, the sample was cooled to ambient temperature and an aliquot was taken for GCMS analysis for nitrosamine quantification.

The inorganic salts were used in excess (4.0 wt. %) and unsurprisingly did not dissolve well in the non-aqueous solvent. Still, the decomposition of NO-NMBzA was doubled with the use of the inorganic base (~8 mol %) compared to the non-base treated sample (~4 mol %) The NAS process absorbs significant moisture from the flue gas (~8.0 wt. %) which could facilitate the dissolution of the inorganic bases. Inclusion of 8.0 wt. % water to the base-treated system was found to improve the decomposition of NO-NMBzA. The wet KOH-treated sample decomposed the nitrosamine by 12 mol % over 18 hours and reached 37 mol % nitrosamine decomposition by 80 hrs. Similarly, the wet $K_2CO_3$ sample decomposed the nitrosamine by 13 mol % over 18 hrs. and reached 42 mol % decomposition by 80 hours. Doubling the base concentration had minimal effect on the nitrosamine decomposition. Aqueous ammonium hydroxide performed similarly to the other inorganic bases.

Hydroxyl-Radical Promoted Decomposition (Comparative):

A 25 mL thick-walled glass pressure vessel was equipped with a stir bar and charged with 5.0 g of the stock NO-NMBzA in Genosorb®1843 solution. The peroxide (4.0 wt. % based on the w/w concentration of the peroxide) was added and the vessel was sealed with a Teflon screw cap, placed in an oil bath that was preheated (25-150° C.), and stirred for 20 hours. Upon time completion, the sample was cooled to ambient temperature and an aliquot was taken for GCMS analysis for nitrosamine quantification. All reactions that involved heating the peroxide solution were conducted in a fume hood behind a blast shield.

The thermal decomposition of nitrosamines has been proposed to proceed via homolytic cleavage of the N—NO bond to produce amine and NO• radicals. The addition of radical-generating oxidants to amine-based $CO_2$ solvents could potentially decompose the nitrosamines selectively. The addition of hydroxyl radicals, formed from hydrogen peroxide ($H_2O_2$) with UV light or ozone, to waste water streams and wash water collected from amine-based carbon capture processes has been used to decompose contaminating nitrosamines in aqueous solutions. It was anticipated that heat could promote hydroxyl radical formation in our non-aqueous solvent system to decompose NO-NMBzA. Addition of 30% wt. % aq. $H_2O_2$ to the 4000 ppm NO-NMBzA in Genosorb® mixture produced minimal decomposition of the nitrosamine over 20 hrs. at 25° C. and 50° C. Heating further to 150° C. to enhance hydroxyl radical formation did not effectively destroy the nitrosamine. The meager reactivity indicated that the hydroxyl radicals may likely be poorly soluble in Genosorb® 1843.

To improve hydroxyl radical solubility, benzoyl peroxide (BPO) was selected due to its solubility in ether. Treatment of the nitrosamine in Genosorb® 1843 with 70 wt. % aq. BPO led to 21 mol % decomposition at 25° C. over 20 hrs. Increasing the temperature to 50° C. and 150° C. improved the decomposition to 27 mol % and 31 mol % respectively. GCMS analysis of the BPO-treated nitrosamine solution revealed no NMBzA present in solution, only the oxidized product benzaldehyde. Although not intending to be limited by theory, it is probable that the hydroxyl radicals would be consumed by the electron-rich, benzylic amine NMBzA before they could reach the nitrosamine, ruling this pathway ineffective for nitrosamine decomposition.

Alkoxide Base Decomposition:

The inorganic base and hydroxy radical nitrosamine decomposition pathways appeared limited by the solubility of the additive employed. To overcome the solubility barrier, strong alkoxide bases were substituted to facilitate the decomposition. To a 40 mL glass vial equipped with a magnetic stir bar was added the alkoxide (85 mg, 1.7 wt. %) followed by 5.0 g of the stock NO-NMBzA in Genosorb® 1843 solution. The vial was sealed with a Teflon cap and either placed in an oil bath that was preheated (40-150° C.) and stirred for 18 h or placed on a stir plate and stirred for 5-30 minutes. Upon time completion, the sample was cooled to ambient temperature and an aliquot was taken for GCMS analysis for nitrosamine quantification.

This study was initiated with potassium tert-butoxide (KOtBu), which is highly soluble in ether media. Addition of 4.0 wt. % KOtBu to the 4000 ppm NO-NMBzA in Genosorb mixture at 150° C. successfully decomposed the nitrosamine with full conversion (100 mol %) over 18 hrs. (Experiment 1, Table 1). The decomposition of the nitrosamine in Genosorb® 1843 was versatile. The nitrosamine can be decomposed below GCMS detection (>99% decomposition) at temperatures, e.g., of about 25-150° C. (Experiments 1-5, Table 1). The amount of KOtBu employed could be decreased to 1.7 wt. % to promote 100% decomposition of the nitrosamine (Experiments 5-7, Table 1). Using less than 1.7 wt. % KOtBu resulted in incomplete decomposition over 18 hrs. (Experiment 8, Table 1).

The excess alkoxide employed was required because the Genosorb® 1843 solvent was not dry. As such, treatment of the nitrosamine with 1 equivalent of KOtBu in Genosorb® 1843 resulted in only 56% decomposition. The incomplete nitrosamine decomposition from stoichiometric alkoxide addition revealed that there must be competing pathways of reactivity. Due to the simplicity of the reaction composition, the most obvious alkoxide side reaction was with water, contaminating the solvent, to form hydroxide. The instability of alkoxide bases to protic solvents is well-known. Karl-Fischer moisture analysis on the Genosorb® 1843 solvent showed an average water content of 0.47 wt. %. The water molar content superseded the nitrosamine by a ratio of 1.4:1 in Genosorb® 1843, believed to be acting as a significant pathway to consume the alkoxide. The alkoxide-promoted decomposition of the nitrosamine in the presence of water is significant for practical application of this methodology.

TABLE 1

Addition of soluble strong bases for N—NO bond cleavage of nitrosamine in Genosorb.[a]

| Experiment # | Additive | Loading (wt. %) | Temperature (° C.) | Time (h) | % Decomp. |
|---|---|---|---|---|---|
| 1 | KOtBu | 4.0 | 150 | 18 | 100 |
| 2 | KOtBu | 4.0 | 120 | 18 | 100 |
| 3 | KOtBu | 4.0 | 80 | 18 | 100 |
| 4 | KOtBu | 4.0 | 40 | 18 | 100 |
| 5 | KOtBu | 4.0 | 25 | 18 | 100 |
| 6 | KOtBu | 2.0 | 25 | 18 | 100 |
| 7 | KOtBu | 1.7 | 25 | 18 | 100 |
| 8 | KOtBu | 1.5 | 25 | 18 | 91 |

[a]Decomposition studies conducted with 4000 ppm N-nitroso-N-benzylmethylamine in Genosorb ® 1843.

Remarkably, the kinetics for nitrosamine decomposition with alkoxide bases is extremely rapid. Treatment of 4000 ppm NO-NMBzA with 1.7 wt. % KOtBu in Genosorb® 1843 was found to promote 96 mol % decomposition within 5 minutes at 25° C., with no detectable NO-NMBzA found in solution after 15 mins (Experiments 1 and 2, Table 2). The fast decomposition kinetics are general for Genosorb-soluble alkoxides, with sodium isopropoxide (NaOiPr), sodium methoxide (NaOMe) and potassium methoxide (KOMe) achieving greater than 85 mol % decomposition of the nitrosamine within 15 minutes of exposure (Experiments 3-5, Table 2). Extension of the contact time for 30 mins affords 100% nitrosamine decomposition using all the alkoxide bases.

TABLE 2

Rapid N—NO bond cleavage of NO—NMBzA in Genosorb from strong soluble bases.[a]

| Experiment # | Additive | Loading (wt. %) | Temperature (° C.) | Time (min) | % Decomp. |
|---|---|---|---|---|---|
| 1 | KOtBu | 1.7 | 25 | 5 | 96 |
| 2 | KOtBu | 1.7 | 25 | 15 | 100 |
| 3 | NaOiPr | 1.7 | 25 | 15 | 94 |

TABLE 2-continued

Rapid N—NO bond cleavage of NO—NMBzA in Genosorb from strong soluble bases.[a]

| Experiment # | Additive | Loading (wt. %) | Temperature (° C.) | Time (min) | % Decomp. |
|---|---|---|---|---|---|
| 4 | NaOMe | 1.7 | 25 | 15 | 85 |
| 5 | KOMe | 1.7 | 25 | 15 | 88 |

[a]Decomposition studies conducted with 4000 ppm N-nitroso-N-benzylmethylamine in Genosorb® 1843.

After achieving complete decomposition of the nitrosamine, two nitrogen-based products were observed in the reaction mixture: N-methyl-1-phenylmethanimine (major, 87% yield) and benzylamine (minor, 6% yield). The major decomposition pathway for NO-NMBzA likely follows the mechanism proposed by Rochelle and coworkers. See FIG. 4A and Fine et al., Environ. Sci. Technol. 2014, 48(10), 5996-6002, which is incorporated herein by reference in its entirety. In this mechanism, base deprotonation of the methylene C—H bond of NO-NMBzA initiates an E2-elimination of the nitrosyl anion, ⁻NO, through N—N bond cleavage producing N-methyl-1-phenylmethanimine and tert-butanol. The nitrosyl anion extracts a hydrogen atom from the solution to form hyponitrous acid which spontaneously decomposes to form nitrous oxide ($N_2O$). The minor decomposition pathway forming benzylamine may proceed through a primary N-nitrosamine intermediate (see FIG. 4B). Attack of the N-methyl group of NO-NMBzA by KOtBu could form methyl tert-butyl ether and N-nitrosobenzylamine after hydrogen abstraction. The primary nitrosamine is very electron deficient at the nitrogen atom, promoting further attack by KOtBu at the nitroso nitrogen to afford benzylamine after hydrogen abstraction. The direct attack of alkoxides on the nitroso nitrogen has been suggested in the reaction of N-nitroso-N-alkylureas with ethoxide.

The non-aqueous solvent (NAS) $CO_2$ capture process that served as the basis of the study comprises NMBzA in Genosorb® 1843 to remove $CO_2$ from emitted flue gas. At 5 g-scale, a solution of 4000 ppm NO-NMBzA in the NAS solvent mixture (NMBzA and Genosorb® 1843) was treated with 1.7 wt. % KOtBu for 15 minutes at 25° C. (FIG. 5). The KOtBu reagent was capable of fully decomposing the nitrosamine below detection in the NAS solvent. Increasing the scale to 100 g, it was found that 1.5 wt. % KOtBu could fully decompose the nitrosamine within 15 mins. The 100 g-scale reaction demonstrates that the alkoxide loading can potentially be decreased to more near-stoichiometric ratios with the nitrosamine on larger scales. The selective decomposition of the nitrosamine in the NAS solvent system illustrates the potential use of alkoxide bases for mitigating nitrosamine formation in $CO_2$ capture processes.

Karl-Fischer moisture analysis of the larger-scale solvent composition with NMBzA and Genosorb® 1843 showed an average water content of 0.66 wt. %. The 100 g-scale reaction demonstrates that the alkoxide loading can be decreased to more near-stoichiometric ratios with the nitrosamine on larger scales. The selective decomposition of the nitrosamine in the NAS solvent system illustrates the potential use of alkoxide bases for mitigating nitrosamine formation in a water-lean $CO_2$ capture process.

A key concern regarding the deployment of alkoxide bases was deactivation by water in the solvent. Water is ever-present in flue gas $CO_2$ capture processes in concentrations between 5-12 wt. %. After flue gas is introduced to the NAS solvent, water content will build up in the solvent through solubilization. The nitrosamine decomposition was effective in the modeled NAS solvent comprised of NMBzA and Genosorb® 1843, which had a water content of 0.66 wt. %. An imitated water-saturated, flue gas exposed nitrosamine-contaminated NAS solvent composition (4000 ppm NO-NMBzA, 9 wt. % $H_2O$, and NMBzA in Genosorb® 1843) was treated with 1.7 wt. % KOtBu for 30 mins. Analysis of the mixture showed only 8 mol % decomposition achieved (FIG. 5). The alkoxide was ineffective for decomposing the nitrosamine in a water-rich NAS solvent system. Examining water loadings from 0.7 to 4.7 wt. % showed a significant impact from increasing water content above 0.7 wt. % loadings while maintaining 1.7 wt. % KOtBu treatment (FIG. 6). Increasing the water content outcompetes the nitrosamine for alkoxide consumption.

The decomposition of nitrosamines in the $CO_2$ capture process thus would reasonably benefit from a pre-drying stage to reduce the water content. Alternatively, water management approaches could be employed to reduce the cost of drying the solvent system. The short timeframe for nitrosamine decomposition at low temperatures with alkoxides uses minimal energy which can offset increased costs associated with a pre-drying stage. It may not be applicable to completely remove water from the NAS system; therefore, it may be possible in some embodiments to use extra alkoxide, wherein the extra alkoxide can act additionally as a water scavenger. This strategy was demonstrated in a 2.0 wt. % water-loaded NAS solvent (FIG. 7). Addition of 1.7 wt. % KOtBu resulted in 28 mol % decomposition. Increasing the alkoxide to 4.0 wt. % achieved 100 mol % decomposition, signifying the direct relationship between the water content and alkoxide loading to achieve nitrosamine decomposition from higher water content. Additionally, the 2.0 wt. % water-loaded NAS solvent was treated first with a drying agent ($MgSO_4$) and then with 1.7 wt. % KOtBu to provide complete nitrosamine decomposition.

The addition of the alkoxide to the NAS to decompose the nitrosamine introduces several new compounds into the solvent composition (e.g., possibly tert-butanol, N-methyl-1-phenylmethanimine, KOH, KOtBu and/or KN(Me)Bn). The $CO_2$ loading capacity of the NAS system, both with and without KOtBu treatment, was measured through an acidic evolution method. The solvent was saturated with $CO_2$ through bubbling and then separately treated with acid to quantitate the $CO_2$ evolved with a $CO_2$ analyzer. Four $CO_2$ loading experiments were conducted to isolate the effect of adding KOtBu to the NAS system (FIG. 8). Benchmark $CO_2$ loadings of ~0.44 $mol_{CO2}/mol_{amine}$ were established for both the NAS system and 4000 ppm nitrosamine-contaminated NAS (Table 3). Decomposing the nitrosamine with 2.0 wt. % KOtBu in the NAS solvent was found to increase the $CO_2$ loading of the treated system to 0.48 $mol_{CO2}/mol_{amine}$. The increased $CO_2$ loading is likely associated from left over KOtBu in solution reacting with $CO_2$ to form potassium tert-butyl carbonate. The increase in capacity associated from alkoxide addition would not be sustained over repeated cycling. Importantly, nitrosamine mitigation through alkoxide treatment does not hinder the $CO_2$ loading of the NAS solvent.

TABLE 3

CO$_2$ loading of NAS solvent with and without KOtBu treatment.[a]

| Experiment | CO$_2$ Loading (mol$_{CO2}$/mol$_{amine}$)[b] | | |
|---|---|---|---|
| | Run 1 | Run 2 | Error Deviation |
| NAS | 0.428 | 0.446 | +0.018 |
| NO—NMBzA/NAS | 0.455 | 0.441 | −0.014 |
| KOtBu treated NO—NMBzA/NAS | 0.485 | 0.482 | −0.003 |

[a]Solutions were prepared and loaded with CO$_2$ at 25° C. for 2 hrs.
[b]CO$_2$ evolution from the solvent was determined via acidic evolution using 30 wt. % H$_2$SO$_4$ solution and N$_2$ as a carrier gas.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of decreasing nitrosamine content, comprising:
    receiving a non-aqueous solvent system having a first nitrosamine content; and
    contacting the non-aqueous solvent system with a composition comprising one or more alkoxides to give a treated solvent system having a second nitrosamine content that is lower than the first nitrosamine content.

2. The method of claim 1, wherein the non-aqueous solvent system is a solvent system for acid gas removal from a gas stream.

3. The method of claim 2, wherein the non-aqueous solvent system is a solvent system for acid gas removal from a flue gas stream, a nitric acid plant stream, or an adipic acid plant stream.

4. The method of claim 1, wherein the non-aqueous solvent system is an amine-based solvent system.

5. The method of claim 1, wherein the one or more alkoxides have pKa values of about 14.5 or greater.

6. The method of claim 5, wherein the one or more alkoxides have pKa values of about 14.5 to about 18.

7. The method of claim 1, wherein the one or more alkoxides are selected from the group consisting of methoxides, ethoxides, propoxides, butoxides, pentoxides, hexanoxides, and combinations thereof.

8. The method of claim 1, wherein the one or more alkoxides are alkali salts.

9. The method of claim 1, wherein the one or more alkoxides comprise sodium methoxide, sodium isopropoxide, or potassium tert-butoxide.

10. The method of claim 1, wherein the composition is a liquid composition.

11. The method of claim 10, wherein the composition comprises the one or more alkoxides and one or more solvents, wherein the one or more solvents comprise alcohols, polyethylene glycol dialkyl ethers, and combinations thereof.

12. The method of claim 1, wherein no heat is intentionally applied during the contacting.

13. The method of claim 1, further comprising applying heat during the contacting.

14. The method of claim 1, wherein the second nitrosamine content is about 10 ppm or less.

15. The method of claim 14, wherein the second nitrosamine content is about 1 ppm or less.

16. The method of claim 1, wherein the second nitrosamine content is about 100 ppb or less.

17. The method of claim 1, further comprising drying the solvent system before the contacting.

18. The method of claim 17, wherein the drying comprises desiccation, distillation, or a combination thereof.

19. The method of claim 18, wherein the desiccation employs a drying agent selected from the group consisting of molecular sieves, silica, sodium sulfate, potassium sulfate, magnesium sulfate, calcium chloride, or a combination thereof.

20. The method of claim 1, further comprising calculating a minimum amount of the one or more alkoxides to be used based on the first nitrosamine content and a content of water present in the solvent system.

21. The method of claim 20, wherein the calculated minimum amount of the one or more alkoxides is an amount stoichiometrically equal to a sum of moles of nitrosamine and water present in the solvent system.

22. The method of claim 1, wherein the solvent system is present in a first unit of a gas treatment system and wherein the method further comprises directing the solvent system to a second unit of the gas treatment system, wherein the contacting is conducted in the second unit.

23. The method of claim 22, wherein the directing the solvent system further comprises passing the solvent system through a drying unit to remove water before the contacting.

24. The method of claim 1, wherein the contacting is conducted at pre-determined values of first nitrosamine content.

25. The method of claim 24, wherein the contacting is conducted whenever the first nitrosamine content is about 4% by weight.

26. The method of claim 24, wherein the contacting is conducted whenever the first nitrosamine content is about 3% by weight.

27. A method of treating a gas stream to remove acid gases therefrom, comprising:
    bringing the gas stream into contact with a non-aqueous solvent system,
        wherein the bringing results in removal of acid gases from the gas stream and formation of nitrosamines within the non-aqueous solvent system such that the non-aqueous solvent system has a first nitrosamine content; and
    contacting the non-aqueous solvent system with a composition comprising one or more alkoxides to give a treated solvent system having a second nitrosamine content that is lower than the first nitrosamine content.

* * * * *